United States Patent [19]

Werner

[11] Patent Number: 4,895,459

[45] Date of Patent: Jan. 23, 1990

[54] FIXING ARRANGEMENT FOR A REVOLVING SHOE OF A ROLLING MEMBER GUIDE

[76] Inventor: Jacob Werner, Brianring 29, D-6000 Frankfurt/Main 70, Fed. Rep. of Germany

[21] Appl. No.: 370,459

[22] Filed: Jun. 23, 1989

[30] Foreign Application Priority Data

Jul. 16, 1988 [DE] Fed. Rep. of Germany ....... 3824192

[51] Int. Cl.$^4$ ............................................ F16C 29/06
[52] U.S. Cl. ........................................ 384/43; 384/49; 384/57
[58] Field of Search ................................... 384/38–40, 384/43–45, 50, 49, 57

[56] References Cited

U.S. PATENT DOCUMENTS

| 3,934,946 | 1/1976 | Burr et al. | 384/45 |
| 4,557,530 | 12/1985 | Haase | 384/45 |
| 4,729,669 | 3/1988 | Walter et al. | 384/45 |

Primary Examiner—Thomas R. Hannon
Attorney, Agent, or Firm—Toren, McGeady & Associates

[57] ABSTRACT

A fixing assembly for fixing a revolving shoe of a rolling member guide to a supporting element, including an eccentric assembly having a cylindrical bore in a revolving shoe, a cylindrical pin fixed on the one hand in a bore of the supporting element and accommodated on the other hand in a cylindrical pin bore arranged eccentrically relative to the cylindrical outer face of the eccentric bush, the revolving shoe 2 being adjustable relative to the running tracks of the guiding rail via a collar provided with an outer hexagon so as to permit adjustment of play by displacement, additionally, the cylindrical bolt has a threaded extension onto which a nut may be screwed, a securing plate fixed the position of the eccentric bush and the nut, and a fixing pin assembly with a cone is provided which engages a corresponding conical bore of the supporting element.

11 Claims, 3 Drawing Sheets

FIXING ARRANGEMENT FOR A REVOLVING SHOE OF A ROLLING MEMBER GUIDE

BACKGROUND OF THE INVENTION:

The present invention relates to a fixing arrangement for fixing the revolving shoe of a rolling member guide to a supporting element with bolts for tensioning the revolving shoe and supporting element, as well as means for fixing the adjusting position.

Revolving shoes are usually attached to a supporting element in that the fixing bolts whose shank diameter is smaller than the fixing bores in the shoe through which the extend are initially carefully tightened, while simultaneously aligning the revolving shoe and the rows of roller members relative to the guiding rail by moving them. Then, final tightening and pinning down of the position as set take place by providing pin bores and inserting the fitting pins. However, such a procedure does not permit an accurate adjustment of play.

To improve the adjustment of play there are prior art solutions in which the revolving shoe is initially fixed in an approximately position as described above. However, the revolving shoe comprises an adjustment mechanism which covers a deformation region and a supporting region. The contact region of the rolling members is designed to be deformable. To permit the adjustment of play, the contact region may be deformed via pressure bolts, for example, which are supported on the supporting region. This is a complicated design, and the adjusting process is difficult.

SUMMARY OF THE INVENTION

Accordingly, it is an object of the present invention to provide fixing means for a revolving shoe which permit adjustment and re-adjustment of play in an easy way and which, in addition, permit firm fixing in the position as set.

Pursuant to this object, and others which will become apparent hereinafter, one aspect of the present invention resides in the revolving shoe comprising a through-bore which contains an externally cylindrical eccentric bush having a pin bore which is arranged so as to be eccentric relative to the cylindrical outer face of the eccentric bush. A cylindrical pin attached to the supporting element being received in, so as to fit into, the pin bore. There are further provided two threaded fixing bores which are offset in the direction opposite to that of the through-bore and into each of which a fixing pin can be inserted whose free end is tapered so as to run out in a cone which may engage a conical bore of the supporting element. Additionally, the revolving shoe is associated with at least one fixing bolt.

The advantage of this design is that the eccentric bush permits an accurate adjustment of play. The eccentric bush acts like a kind of scale arm permitting accurate contact of the row of rolling members with the guiding rail. The revolving shoe may be finally fixed via the fixing pins and the fixing bolt. The design of the fixing pins and the eccentric adjuster is such that even subsequently it is possible to correct the setting.

In a preferred embodiment, the eccentric bush is provided with a collar having a tool engaging face, especially an external hexagon. In this way, it is possible to adjust or rotate the eccentric bush relative to the cylindrical pin and the through-bore of the revolving shoe via a tool.

One end of the cylindrical pin is provided with a head and the other end, especially the end protruding from the revolving shoe, with a threaded extension on to which a nut may be threaded. The nut serves securing purposes and helps to press the revolving shoe against the supporting element.

To secure the position of the eccentric bush, between the collar of the eccentric bush and the nut there is arranged on the threaded extension a securing plate comprising two tabs one of which is attached to a tool engagement face of the collar and the other one to a key face of the nut.

To ensure accurate contact, the invention provides for the through-bore to be arranged approximately in the center of the longitudinal extension of the revolving shoe, with the fixing pins and the fixing bolts being arranged so as to be laterally offset relative the through-bore. This design ensure the most advantageous adaptation to the guiding rail, as well as adjustment of play and fixing.

Furthermore, it is proposed that the fixing bolts should be arranged between the through-apertures and the fixing pins. This results in an advantageous lever arm for the engagement of the fixing pins.

In a further embodiment, the revolving shoe comprises for the fixing pin a fixing bore having a threaded portion and a cylindrical guiding portion and the fixing pin, adjoining its core, is provided with a guiding shank portion matching the guiding portion as well as with a threaded shank portion. The guiding shank portion rests against the inside of the guiding portion and ensures a firm support of the conical portion and thus, a rigid connection.

To obtain an advantageous adjusting region, the greatest diameter of the conical bore in the supporting element should be at least as great as the greatest diameter of the cone associated with the fixing pin. This allows the bridging of tolerances and a increase in the adjusting region.

Finally, the revolving shoe is used in a liner guiding assembly, and opposite it, there has been provided a revolving shoe which is rigidly attached to the supporting element so as to be non-adjustable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
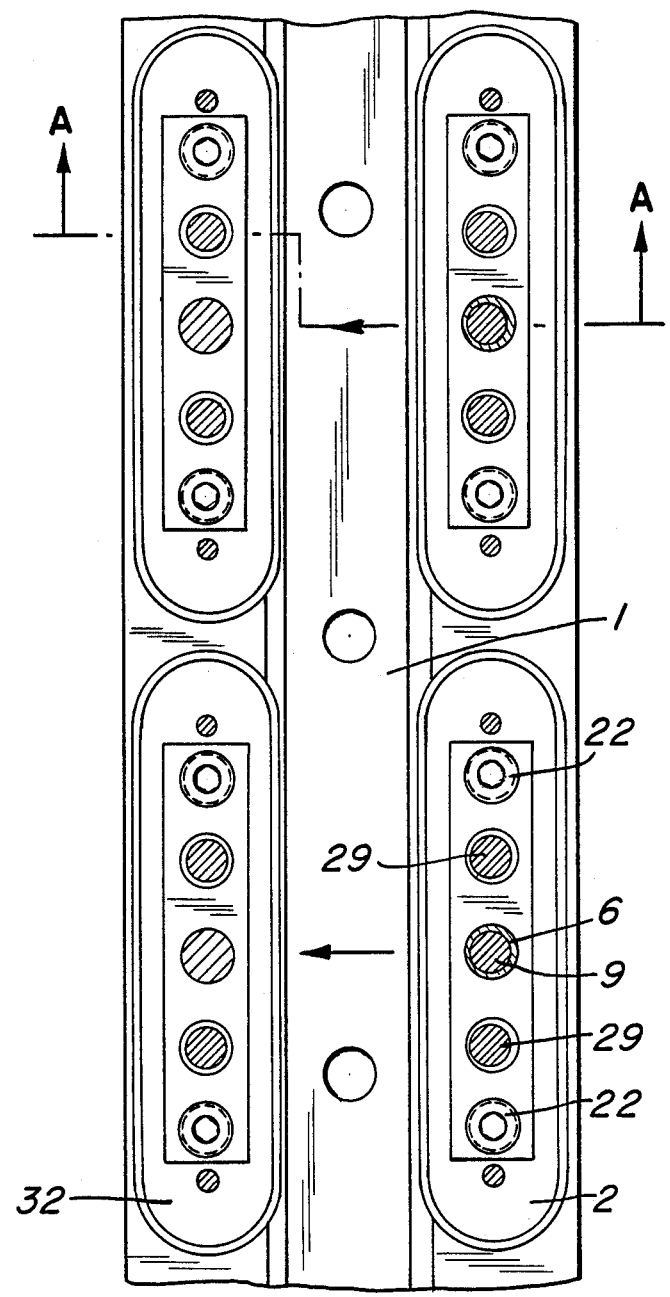
FIG. 1 shows a section B—B to FIG. 2.

DETAILED OF THE PREFERRED EMBODIMENTS:

FIG. 1 shows a linear guiding assembly in which a guiding rail 1 is associated with four revolving shoes 2, 32 attached to a supporting element 3.

Two revolving shoes 32 are arranged so as to be stationary, i.e. they are attached in the usual way via a pinned connection and fixing bolts. These stationary revolving shoes 32 are each associated with oppositely arranged revolving shoes 2 designed to permit the adjustment of play.

Figure 2:
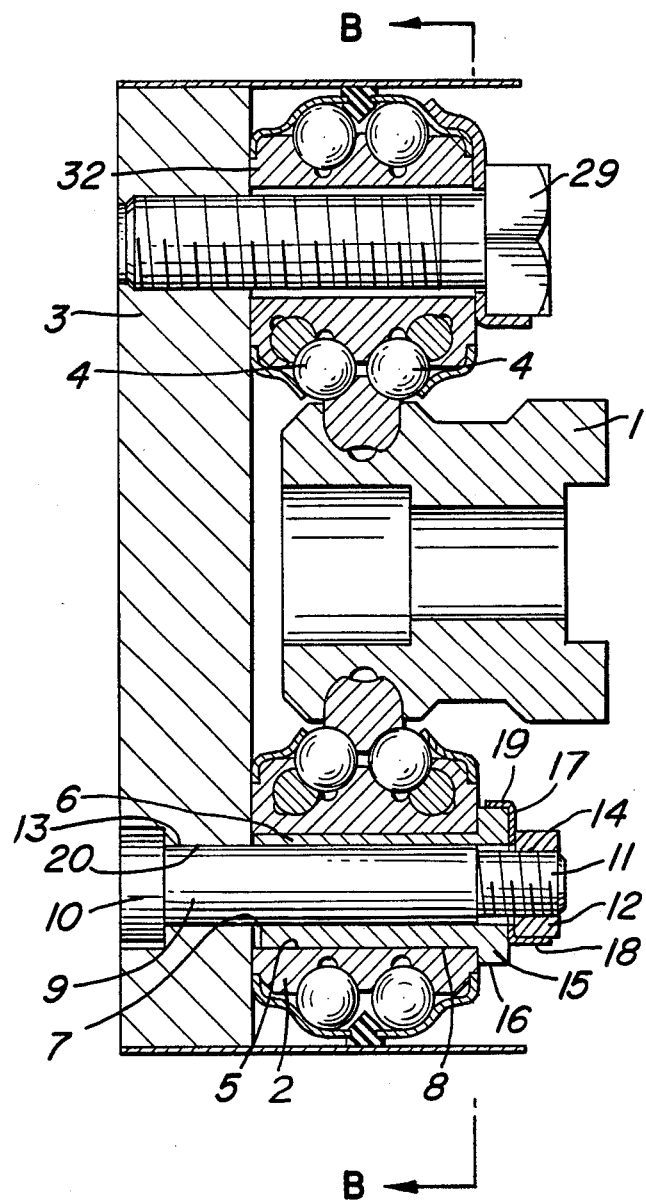
FIG. 2 shows a section A—A to FIG. 1.
Figure 3:
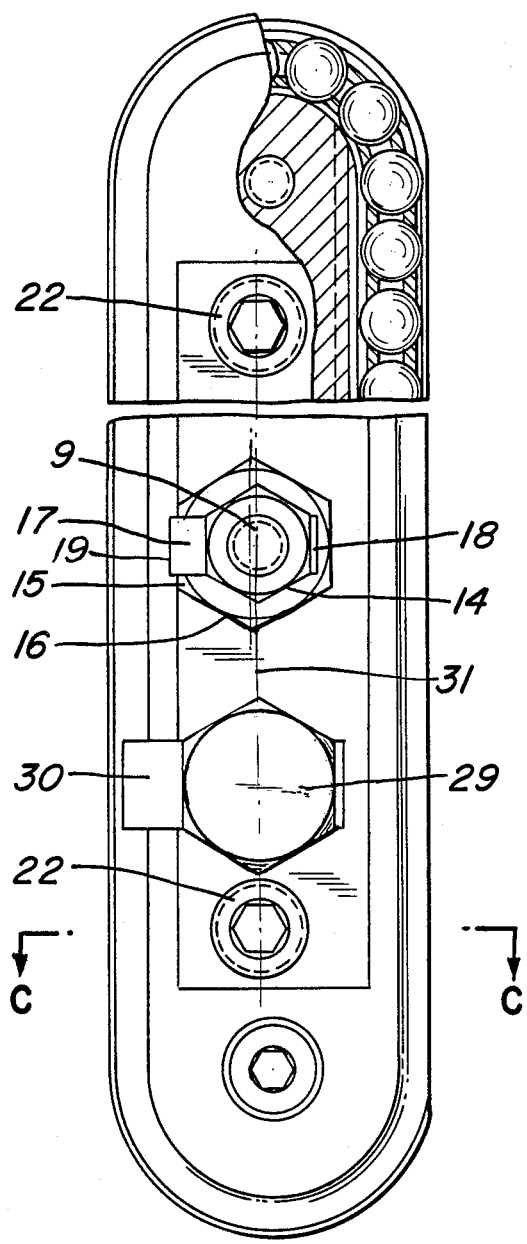
FIG. 3 is a plan view of an individual revolving shoe having an inserted fixing element.
Figure 4:
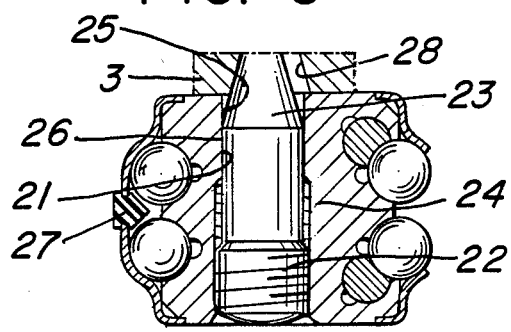
FIG. 4 shows a section C—C to FIG. 3.

The design of the fixing means for the revolving shoes 2 is illustrated in FIGS. 2 to 4. The revolving shoe 2 serves to guide rolling members 4 which in the present embodiment are designed as balls. The rolling members 4 are guided around the revolving shoe 2 in a continuous row. In the supporting region they project from the revolving shoe 2 and in this region they reset against the counter track of the guiding rail 1. FIG. 4 shows that in the present embodiment there is a revolving shoe 2 with two rows rolling members 4.

In approximately the center of the longitudinal extension of the revolving shoe, there is provided an eccentric assembly on the axis 31 so as to be slightly offset relative to the central axis of the revolving shoe, with the revolving shoe 2 being provided with a through-bore 5 into which an eccentric bush 6 is inserted. The eccentric bush 6 comprises a cylindrical outer face 8. Its bore 7 is provided so as to be eccentric relative to the cylindrical outer face 8. The eccentric bush 6 has a collar 15 whose outside is designed as a hexagon 16 for turning the eccentric bush 6 by means of a wrench.

A cylindrical pin 9 having a head 10 is inserted into a bore 20 of the supporting element 3. The cylindrical pin comprises a cylindrical outer face 13 with which it is received in, so as to fit into, the pin bore 7 of the eccentric bush 6 and the bore 20.

The end of the cylindrical pin 9 facing away from the head 10 has a threaded extension 11 which projects from the eccentric bush 6 beyond the collar 15 and on to which a nut 12 may be screwed. It can be seen that by turning the eccentric bush 6, the revolving shoe 2 may be made to approach, or move away from, the guiding rail 1. In this way, it is possible to adjust the play. As the eccentric bush 6 is arranged approximately in the center of the longitudinal extension of the revolving shoe 2, it is easy for the row of rolling members to be adapted to the counter track of the guiding rail 1. The position of the eccentric bush 6 and thus of the revolving shoe 2 is fixed for example by a securing plate 17 comprising two tabs 18, 19, one 18 of which may be made to rest against a key face 14 of the nut 12 and the other one 19 against a tool engagement face of the outer hexagon 16 of the collar 15 of the eccentric bush 6. In this way, the relative position of the eccentric bush 6 relative to the nut and revolving shoe 2 is secured.

In addition, there is provided a fixing pin assembly comprising fixing pins 22 which are arranged o the axis 31 so as to be offset relative to the through-bore 5. For this purpose, the revolving shoe 2, as can be seen in FIG. 4, has a stepped fixing bore 21 comprising a threaded portion 24 and a guiding portion 25. The guiding portion 25 is designed as a cylindrical bore. A fixing pin 22 also comprising a threaded shank portion 27 and a guiding shank portion 26 is inserted into the fixing bore 21. The end of the fixing pin 22 facing away from the threaded shank portion 27 comprises a cone 23 tapered towards its end. The fixing pin 22 may be screwed into the fixing bore 21 more or less deeply, so that the cone 23 of the fixing pin 22 projects to a greater or lesser extent from the revolving shoe 2 or its planar face, depending on the extent to which it has been screwed in.

The cone 23 of the fixing pin may engage a matching conical bore 28 of the supporting element 3 so that the position of the revolving shoe 2 is securable. Depending on the relative position of the revolving shoe 2 and thus, of the cone 23 relative to the conical bore 28 in the supporting element 3, the cone 23 and the fixing pin 22 are inserted more or less deeply into the conical bore 28. Because of the conical design it is possible to bridge the tolerances. But an accurate fixing position can nevertheless be achieved through the contact of the cone 23 in the conical bore 28. Therefore, the greatest diameter of the conical bore 28 should be at least as great as the greatest diameter of the cone 23 in order to obtain an adequate adjusting region.

As can be seen in FIG. 3, two fixing pins 22 are arranged at a distance from the eccentric assembly, i.e. the bush 6. Between the eccentric bush 6 and the fixing pin 22 there is a fixing bolt 29 which is also secured by a securing plate 30 in its fixing position relative to the revolving shoe 2. The fixing bolt 29 comprises a threaded shank which is smaller than the bore in the revolving shoe 2 through which it passes in order not to obstruct the adjustment of the revolving shoe 2 by the eccentric bush 6.

By providing the eccentric assembly including the eccentric bush 6 and by arranging the fixing pins 22, adjustment is made easy and in consequence, re-adjustment does not cause any complications either.

While the invention has been illustrated and described as embodied in a filing means for a revolving shoe of a rolling member guide, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic o specific aspects of this invention.

What is claimed as new and desired to be protected by letters patent is set forth in the appended claims.

What is claimed is:

1. A fixing arrangement for fixing a revolving shoe of a rolling member guide to a supporting element with bolts for tensioning the revolving shoe and supporting element, and for fixing an adjusting position, comprising:
    a revolving shoe (2) having a through-bore (5);
    an externally cylindrical eccentric bush (6) arranged in the through-bore (5) and having a pin bore (7) arranged so as to be eccentric relative to the cylindrical outer face (8) of the eccentric bush (6);
    a cylindrical pin (9) attached to the supporting element (3) so as to fit into the pin bore (7), the revolving shoe further having two threaded fixing bores (21) which are offset in a direction opposite to that of the through-bore (5);
    fixing pins (22) which are insertable into each of the fixing bores (21) and have a tapered free end so as to run out in a cone (23) engageable with a conical bore (28) of the supporting element (3); and
    at least one fixing bolt (29) associated with the revolving shoe (2).

2. A fixing arrangement according to claim 1, wherein the eccentric bush (6) has a collar (15) with a tool engaging face.

3. A fixing arrangement according to claim 2, wherein the cylindrical pin (9) has one end provided with a head (10) and another end with a threaded extension (11) onto which a nut (12) is threadable.

4. A fixing arrangement according to claim 3, and further comprising a securing plate (17) arranged on the threaded extension (11) between the collar (15) of the eccentric bush (6) and the nut (12), the securing plate (17) having two tabs, (18, 19) one of which is attached to the tool engaging face (16) of the collar (15) and the other to a key face (14) of the nut (12).

5. A fixing arrangement according to claim 3, wherein the another end of the cylindrical pin (9) protrudes from the revolving shoe (2).

6. A fixing arrangement according to claim 2, wherein the collar (15) of the eccentric bush (6) is an external hexagon (16).

7. A fixing arrangement according to claim 1, wherein the revolving shoe has a longitudinal extension, the through-bore (5) being arranged approximately in the center of the longitudinal extension of the revolving shoe, the fixing pins (22) and the at least one fixing bolt (29) being arranged so as to be laterally offset relative to the through-bore (5).

8. A fixing arrangement according to claim 7, wherein the at least one fixing bolt (29) is arranged between the through-bore (5) and the fixing pins (22).

9. A fixing arrangement according to claim 1, wherein the fixing bore (21) has a threaded portion (24) and a cylindrical guiding portion (25), and the fixing pins having (22), their cone (23), a guiding shank portion (26) matching the cylindrical guiding portion (25) and a threaded shank portion (27).

10. A fixing arrangement according to claim 1, wherein the conical bore (28) in the supporting element (3) has a greatest diameter at least as great as the greatest diameter of the cone (23) associated with the fixing pin (22).

11. A fixing arrangement according to claim 1, and further comprising an additional revolving shoe (32) rigidly attached to the supporting element (3) so as to be non-adjustable and opposite the revolving shoe (2) so as to form a linear guiding assembly.

* * * * *

UNITED STATES PATENT AND TRADEMARK OFFICE
CERTIFICATE OF CORRECTION

PATENT NO.   : 4,895,459

DATED        : January 23, 1990

INVENTOR(S)  : Werner Jacob

It is certified that error appears in the above-identified patent and that said Letters Patent is hereby corrected as shown below:

On the title page, item [76] should read:

[76] Inventor: Werner Jacob, Brianring 29, D-6000 Frankfurt/Main 70, Fed. Rep. of Germany Signed and Sealed this Nineteenth Day of February, 1991

Attest:

HARRY F. MANBECK, JR.

*Attesting Officer*  *Commissioner of Patents and Trademarks*